United States Patent [19]

Koc et al.

[11] Patent Number: 5,417,952
[45] Date of Patent: May 23, 1995

[54] PROCESS FOR SYNTHESIZING TITANIUM CARBIDE, TITANIUM NITRIDE AND TITANIUM CARBONITRIDE

[75] Inventors: Rasit Koc, Lakewood; Gregory C. Glatzmaier, Boulder, both of Colo.

[73] Assignee: Midwest Research Institute, Kansas City, Mo.

[21] Appl. No.: 249,340

[22] Filed: May 27, 1994

[51] Int. Cl.$^6$ ............ C01B 21/076; C01B 31/34; C01C 3/08
[52] U.S. Cl. ................ 423/380; 423/382; 423/411; 423/440
[58] Field of Search ............ 423/411, 440, 380, 382

[56] References Cited

U.S. PATENT DOCUMENTS

| | | |
|---|---|---|
| 1,088,359 | 2/1914 | Peacock ............... 423/382 |
| 2,356,009 | 8/1944 | Schwarzkopf . |
| 2,722,509 | 11/1955 | Wainer . |
| 2,792,310 | 5/1957 | Steinberg et al. . |
| 3,334,974 | 8/1967 | Fletcher et al. ............ 423/411 |
| 3,492,100 | 1/1970 | Roubin et al. . |
| 3,839,542 | 10/1974 | Chase . |
| 4,247,529 | 1/1981 | Mori et al. ............ 423/380 |
| 4,431,448 | 2/1984 | Merzhanov et al. . |
| 4,460,697 | 7/1984 | Hara et al. . |
| 4,622,215 | 11/1986 | Janey . |
| 4,732,746 | 3/1988 | Crosbie et al. . |
| 4,812,301 | 3/1989 | Davidson et al. . |
| 5,089,047 | 2/1992 | Buljan et al. . |
| 5,166,103 | 11/1992 | Krstic . |
| 5,338,523 | 8/1994 | Krstic ............ 423/440 |

*Primary Examiner*—Wayne Langel
*Attorney, Agent, or Firm*—Edna M. O'Connor

[57] ABSTRACT

A process for synthesizing titanium carbide, titanium nitride or titanium carbonitride. The process comprises placing particles of titanium, a titanium salt or titanium dioxide within a vessel and providing a carbon-containing atmosphere within the vessel. The vessel is heated to a pyrolysis temperature sufficient to pyrolyze the carbon to thereby coat the particles with a carbon coating. Thereafter, the carbon-coated particles are heated in an inert atmosphere to produce titanium carbide, or in a nitrogen atmosphere to produce titanium nitride or titanium carbonitride, with the heating being of a temperature and time sufficient to produce a substantially complete solid solution.

5 Claims, No Drawings

PROCESS FOR SYNTHESIZING TITANIUM CARBIDE, TITANIUM NITRIDE AND TITANIUM CARBONITRIDE

The United States Government has rights in this invention under Contract No. DE ACO2-83CH10093 between the United States Department of Energy and the National Renewable Energy Laboratory, a division of the Midwest Research Institute.

BACKGROUND OF THE INVENTION

I. Field of the Invention

The present invention relates to a process for synthesizing powders of titanium carbide, titanium nitride or titanium carbonitride by coating precursor particles thereof with carbon and heating the coated precursor particles to a temperature sufficient to produce a substantially complete solid solution.

II. Description of the Prior Art

High temperature carbides, nitrides and carbonitrides such as titanium carbide, titanium nitride and titanium carbonitride possess valuable characteristics including high strength, hardness, wear resistance, light weight, high temperature capacity and other properties that make them candidates for many applications. Some examples of use include cutting tools, bullet-proof vests, metal reinforcements, electronic resistors, and other products that can benefit from such properties.

Three present methods are known for the production of titanium carbide, titanium nitride and titanium carbonitride. The first method is a direct carbonization/nitridation of titanium metal or titanium hydride. This method requires five to 20 hours to complete, produces strongly agglomerated powders that require extensive milling to yield fine powders, and require a chemical purification to remove impurities from mill wear.

The second method is a gaseous pyrolysis of a titanium halide, such as TiCl4, in a nitrogen- or carbon-containing atmosphere. Generally poor yields are obtained, even at temperatures exceeding 1,300° C., with reactions conducted at lower temperatures resulting in the formation of non-stoichiometric products. Because of this poor performance, no commercial processes employ this approach.

The third presently-known method for synthesizing titanium carbide, titanium nitride and titanium carbonitride is a carbothermal reduction of titanium dioxide with carbon in a controlled atmosphere (e.g. nitrogen or argon gas) at high temperatures (e.g. 1,700°–2100° C.). Reaction time is typically very long (10–20 hours), and powders produced generally have non-uniform particle sizes (therefore requiring subsequent milling) and undesirable inhomogeneities.

It is therefore apparent that a need is present for a process for producing carbides, nitrides and carbonitrides with uniformity, speed and economy. In accord therewith, a primary object of the present invention is to provide a process for synthesizing titanium carbide, nitride and carbonitride powders possessing high purity, narrow particle size distribution, and stoichiometry for use in making components and composites for structural and electronic applications. This and other objects of the present invention will become apparent throughout the description of the invention which now follows.

SUMMARY OF THE INVENTION

The present invention is a process for synthesizing titanium carbide, titanium nitride or titanium carbonitride. The process comprises placing particles of titanium, titanium salt or titanium oxide within a vessel and providing a carbon-containing gaseous atmosphere within the vessel. The vessel then is heated to a pyrolysis temperature sufficient to pyrolyze the carbon of the carbon-containing atmosphere, thereby resulting in the deposition of a carbon coating on the particles. Thereafter, the carbon-coated particles are heated in an inert atmosphere to produce titanium carbide or in a nitrogen atmosphere to produce titanium nitride or titanium carbonitride, with such heating being of a temperature and time sufficient to produce a substantially complete solid solution.

In a preferred embodiment, the first step of the process is accomplished by depositing carbon on titanium and/or titanium-containing particles by decomposing a hydrocarbon gas in the presence of the particles at a temperature of between about 200° C. and about 1,000° C. The process is completed through performance of the second step wherein titanium carbide, titanium nitride and/or titanium carbonitride synthesis occurs by promoting a reaction within the carbon-coated titanium and/or titanium-containing particles in a nitrogen or argon atmosphere at temperatures of between about 1,200° C. and about 1,600° C. A nitrogen atmosphere promotes formation of nitrides and carbonitrides, while an argon atmosphere promotes formation of carbide compounds. As titanium carbide and titanium nitride make a substantially complete solid solution, $TiC_xN_y$ powders, wherein $x+y=1$, $x \geq 0$, $y \leq 1$, can be expected to form directly from the composite carbon-coated particles. The composition of $TiC_xN_y$ is controlled by the ratio of carbon to titanium in the starting materials and the gas composition. The inventive process here defined produces high purity, high surface area, narrow particle size distribution and low cost titanium carbide, titanium nitride and titanium carbonitride powders.

DETAILED DESCRIPTION OF THE PREFERRED EMBODIMENT

In the prior-art carbothermal reduction of titanium dioxide with carbon, as earlier noted, mixing of titanium dioxide with carbon is performed by mechanical mixing, resulting in separate carbon and titanium dioxide particles. Because separate particles exist, reaction between substantially all of the carbon particles and titanium dioxide particles does not go to completion, resulting in unacceptable quantities of unreacted reactants despite extremely long reaction times. The process is costly, time-consuming, and yields non-uniform powders.

The present invention is a process for the preparation of high quality, low cost titanium carbide, titanium nitride and titanium carbonitride ceramic powders. The first step of this two-step process comprises the coating of titanium and/or titanium dioxide particles with carbon by cracking a thermally decomposable a hydrocarbon gas at a temperature between about 200° C. and about 1,000° C. in the presence of the particles. This step provides intimate contact between the Ti/TiO2 and carbon, and produces a low density carbon coating.

The second step involves the formation of titanium carbide, titanium nitride and/or titanium carbonitride powders by promoting a reaction within the carbon coated particles defined above. This reaction is conducted in a nitrogen-containing or inert gas-containing atmosphere at a temperature between about 1,200° C. and about 1,600° C. A nitrogen atmosphere is employed when nitride-containing products are desired. An inert gas (e.g. argon) atmosphere is employed when only carbide products are desired. As titanium carbide and titanium nitride make a substantially complete solid solution, $TiC_xN_y$ powders (where $x+y=1$, $x \geqq 0$, $y \leqq 1$) can be expected to form directly from the coated powders containing appropriate amounts of carbon.

There are at least three advantages in using carbon-coated particles instead of a mixture of carbon particles and titanium/titanium dioxide particles of the prior art. First, the coating method forms an intimate mix of the reactants, resulting in a continuous supply of carbon monoxide during the reaction and a gas-solid reaction instead of a solid-solid reaction. Second, this methodology provides high surface contact between $Ti/TiO_2$ particles and the carbon. Third, the process produces a high purity powder at a comparatively low temperature because the carbon source is a hydrocarbon. Therefore, impurities such as iron and aluminum, typically found in commercial carbon materials, are eliminated.

The following Examples illustrate the process defined in the preferred embodiment.

Example I

Titanium carbide powders were synthesized by using 20 grams of titanium dioxide powder as a precursor. The titanium dioxide powder had an average particle size of about 0.03 μm and a specific surface area of about 50 m²/g. The titanium dioxide powder was subjected in a reactor to the first step of the process in which a controllable low density, highly porous carbon coating was deposited on the titanium dioxide particles by using propylene gas ($C_3H_6$). Pyrolytic carbon was deposited on the titanium dioxide particles at a temperature of about 420° C. The quality of the carbon coating was investigated by using transmission electron microscopy (TEM) which showed uniform carbon deposition on the titanium dioxide particles. Energy dispersive spectroscopy (EDS) analysis of the particles showed them to be a mixture of titanium dioxide and carbon. The amount of carbon deposition in the coated titanium dioxide particles was determined by using thermogravimetric analysis, which showed that the sample contained about 34 wt. % of carbon. Variables considered were reactor temperature and number of coating cycles. For stoichiometric titanium carbide formation, the calculated amount of carbon on titanium dioxide particles was found to be at least 31.08 wt. %.

To accomplish the second step of the inventive process and thereby form titanium carbide powder, the carbon-coated titanium dioxide particles were heated in the reactor to a temperature of about 1,450° C. for one hour under argon gas flowing at a rate of about one liter per minute. An x-ray diffraction pattern of the resulting sample showed that the particles of the powder formed were cubic (Fm3m) single phase titanium carbide particles and had no second phase. Transmission electron microscopy showed the average particle size in the range of 0.05–0.2 μm, while scanning transmission electron microscopy (STEM) EDS verified that the titanium carbide particles were of a very high purity.

Example II

Titanium nitride powders were synthesized by using 20 grams of titanium dioxide powder coated with carbon in the same manner as in Example I except that about 23 wt. % of carbon was deposited on the titanium dioxide particles. Thereafter, titanium nitride powder was formed by heating the carbon-coated titanium dioxide particles in the reactor to a temperature of about 1,450° C. for two hours under nitrogen gas flowing at a rate of about one liter per minute. An x-ray diffraction pattern of the resulting sample showed that the particles of the powder formed were cubic single phase titanium nitride particles and had no second phase. TEM showed the average particle size in the range of 0.05–0.2 μm, while STEM EDS verified that the titanium nitride particles were of a very high purity.

Through the above Examples it is evident that an inventive process for synthesizing the subject powders provides rapid product formation having high purity and a functional uniformity through narrow particle size distribution. Compounds so made therefore find applicability in making components and composites for structural and electronic applications.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

We claim:

1. A process for synthesizing titanium carbide, titanium nitride or titanium carbonitride powder, the process comprising:
    a) placing particles of titanium, a titanium salt or titanium dioxide within a vessel and providing a carbon-containing gaseous atmosphere within the vessel, said particles appropriately sized to yield a powder having average particle sizes in the range from 0.05 μm to 0.2 μm;
    b) heating the vessel to a pyrolysis temperature sufficient to pyrolyze the carbon to thereby coat the particles with a carbon coating; and
    c) thereafter heating the carbon-coated particles in an inert atmosphere to produce titanium carbide or in a nitrogen atmosphere to produce titanium nitride or titanium carbonitride, said heating being of a temperature and time sufficient to produce a substantially complete solid solution.

2. A process as claimed in claim 1 wherein the carbon-containing gaseous atmosphere is a thermally decomposable gas.

3. A process as claimed in claim 2 wherein the gas is propylene.

4. A process as claimed in claim 2 wherein the pyrolysis temperature is between about 200° C. and about 1,000° C.

5. A process as claimed in claim 2 wherein the temperature sufficient to produce a substantially complete solid solution is between about 1,200° C. and about 1,600° C.

* * * * *